United States Patent
Herbst

(10) Patent No.: US 11,423,787 B1
(45) Date of Patent: Aug. 23, 2022

(54) MULTI-MODAL CONTROL SYSTEM FOR COMMUNICATIONS AND NAVIGATION IN A TRANSPORTATION ENVIRONMENT

(71) Applicant: Richard Herbst, Boynton Beach, FL (US)

(72) Inventor: Richard Herbst, Boynton Beach, FL (US)

( * ) Notice: Subject to any disclaimer, the term of this patent is extended or adjusted under 35 U.S.C. 154(b) by 92 days.

(21) Appl. No.: 17/097,966

(22) Filed: Nov. 13, 2020

Related U.S. Application Data

(63) Continuation-in-part of application No. 16/230,101, filed on Dec. 21, 2018, now Pat. No. 10,839,697.

(60) Provisional application No. 62/609,465, filed on Dec. 22, 2017.

(51) Int. Cl.
| | | |
|---|---|---|
| G01C 21/00 | (2006.01) | |
| G08G 5/00 | (2006.01) | |
| G06F 3/16 | (2006.01) | |
| B64D 43/00 | (2006.01) | |
| G06F 3/0488 | (2022.01) | |
| G06F 3/04817 | (2022.01) | |

(52) U.S. Cl.
CPC ........... *G08G 5/0013* (2013.01); *B64D 43/00* (2013.01); *G06F 3/0488* (2013.01); *G06F 3/04817* (2013.01); *G06F 3/167* (2013.01); *G08G 5/0021* (2013.01)

(58) Field of Classification Search
CPC .... G08G 5/0013; G08G 5/0021; B64D 43/00; G06F 3/04817; G06F 3/0488; G06F 3/167
See application file for complete search history.

(56) References Cited

U.S. PATENT DOCUMENTS

| | | | | |
|---|---|---|---|---|
| 4,212,067 A | * | 7/1980 | Henderson | ................ G01S 5/02 |
| | | | | 701/300 |
| 6,473,675 B2 | * | 10/2002 | Sample | ................ G08G 5/0021 |
| | | | | 701/14 |
| 6,664,945 B1 | | 12/2003 | Gyde et al. | |
| 8,380,366 B1 | | 2/2013 | Schulte et al. | |
| 8,909,392 B1 | * | 12/2014 | Carrico | ................ H04W 4/029 |
| | | | | 455/431 |

(Continued)

*Primary Examiner* — Toan N Pham
(74) *Attorney, Agent, or Firm* — Mark D. Bowen, Esq.; Malin Haley DiMaggio & Bowen, P.A.

(57) ABSTRACT

An aviation radio frequency database and radio frequency control system to automate the retrieval of radio frequencies and tuning of an aircraft radio includes a portable electronic device intended to relieve pilots of retrieving radio frequencies manually from maps, notes and directories eliminates the manual switching of frequencies on radios and other electronic devices replacing these procedures with a direct wireless link from a controlling device to the radio or other electronic device. The application of the invention is not limited to aviation but can be utilized in any utility scenario where operation calls for parameter changes, the object is conserving time and human effort, and raising standards of accuracy and system integrity. Remote control of onboard radio and other controllable electronics is achieved both by delivery of control codes and by use of a voice-to-text application. The configuration of a wireless-accessible database and a range of displays extends the application's utility to many forms of transportation, warehousing, farming, marine applications etc.

8 Claims, 4 Drawing Sheets

(56) References Cited

U.S. PATENT DOCUMENTS 9,716,543 B2 * 7/2017 Gouillou ............ H04B 7/18506
9,772,712 B2 * 9/2017 Kneuper .............. G08G 5/0034
9,820,137 B2 * 11/2017 Cooper ................. H04W 8/005

* cited by examiner

US 11,423,787 B1

MULTI-MODAL CONTROL SYSTEM FOR COMMUNICATIONS AND NAVIGATION IN A TRANSPORTATION ENVIRONMENT

CROSS REFERENCE TO RELATED APPLICATIONS

This application is a continuation-in-part of U.S. patent application Ser. No. 16/230,101, filed on Dec. 21, 2018, which claims the benefit of provisional U.S. Patent Application Ser. No. 62/609,465, filed on Dec. 22, 2017.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1 Field of the Invention

The present invention relates generally to control of communications systems in transportation applications, and more particularly to a self-contained, portable control device and system intended to relieve pilots of retrieving and manually entering radio frequencies from maps, notes, and directories.

2. Description of Related Art

Airports use a number of radio frequencies to place pilots in communication with various aspects of airport operations and services. This example is associated with normal aviation services such as field conditions, ground control, tower, departure, navigation, approach and landing. These services require a number of discrete radio frequencies, at least one for each separate service. Typical operations at a civil airport may require use of 5 to 10 different radio frequencies associated with local as well as area Federal Aviation Administration ("FAA") facilities. These protocols differ from airport to airport. Therefore a pilot departing Airport-A and heading for Airport-B must look up the destination airport's radio frequencies and be prepared to change all radio settings. Radios are typically tuned and set by the pilot manually. In most cases pilots make these changes while in the air. A given frequency, once identified, is manually set using a system of concentric dials or rocker switches on the aircraft's radio to set the frequency by inputting six digits, three on each side of the decimal point.

Legacy aircraft radios are limited to storing two radio frequencies at any one time, an active frequency and a standby which the pilot switches between as illustrated in prior art FIG. 1. This limit is quickly reached and the typical sequence of communications procedures calls for the use of additional frequencies assigned to services. To add a new frequency one of the two already set must be replaced manually. In a fast-moving flight environment such as approach and landing the pilot faces a quickly growing list of tasks centered on radio communications. The pilot manages this using traditional procedures of looking up the frequencies from a directory or from a navigation chart and making written notes. The pilot then sets frequencies manually into the radio. This consumes precious time at the cost of situational awareness, compromising execution of additional tasks which in some cases the pilot skips, and maintaining contact with Air Traffic Control. It also introduces the very real chance of errors in reading or setting typical 4-6 digit frequencies (e.g.: 132.45, 119.325). The traditional solution to the two-frequency restriction is to install multiple 2-channel radios into the aircraft in a vertical configuration described as a "stack."

The FAA provides ground and flight services and associated frequencies in printed directories listed by region, by state, by airport. These publications include the Chart Supplement Directory, Instrument Approach Procedures, and Airport Diagrams. These listings are published quarterly by the FAA. It is the pilot's responsibility to locate radio frequencies assigned to services on an as-needed basis, including changes which may occur during the quarterly periods. These tedious time-consuming tasks include the search for the data and resetting of the radios.

Safety issues include the occurrence of human errors in all phases of the lookup/reset operations; compromising of situational awareness due to loss of actual time allocated to recognition of conditions, random human errors associated with setting and resetting a mechanical radio interface, receiving instructions from Air Traffic Control and events both inside and outside the cockpit in the complex and fast-moving environment of aircraft control. A documented safety issue is the legally mandated requirement (U.S. FAR 121.542/135.100) called the "sterile cockpit rule" in which outside distractions must be kept to a minimum by law.

It is not uncommon for pilots to contact Air Traffic Control for queries and advisories in the wrong order or make requests to the wrong controller largely due to the lack of a published protocol guide for pilots to follow to correctly communicate with ATC and other aircraft. Subsequent errors compromise air safety as a result of controllers having to spend additional time with a confused pilot.

Typical VFR approach procedures may include: a) contacting AWOS/ASOS for a weather advisory; b) contacting CTAF for non-towered control; c) contacting Approach/Departure for a traffic advisory; d) contacting ATIS to monitor airport conditions: winds, altimeter, active runways; e) tuning to a radio directional aid; f) contacting the Control Tower for approach, traffic, landing instructions and after touchdown clearance to contact Ground; g) contacting Ground for taxi instructions and ground traffic advisories. Executing an IFR approach calls for the use of additional instruments and associated radio frequencies. A radio capable of only 2 frequencies, or one that can only be controlled manually adds considerable operational overhead and redundancy greatly extending the time required for critical operations and compromising execution of all phases. The legacy radios' design limitations cause pilot's workload to be significantly increased during the most critical periods of flight: takeoff, approach and landing. The cost is a significant loss of situational awareness resulting in compromised flight safety.

As a result, there exists a need for systems and methods to aid pilots in identifying and setting airport specific radio frequencies on cockpit radios, following communications protocols, and executing changes without delay.

BRIEF SUMMARY OF THE INVENTION

The present invention eliminates the need for looking up most radio information and respective frequencies by referencing an onboard database, and using a tablet computer, CRT or head up display to show the assets associated with a given airport. The present invention further automates the task of changing radio frequencies manually. An additional aspect of the invention is an automatic Wi-Fi update of FAA airport data assuring the pilot that he is using current data and not relying on out of date printed charts and directories. A touch-screen interface is provided which enables the pilot or co-pilot to easily set/change the frequency of their radio and/or other radios and related devices simultaneously. The invention selects and transmits selected frequency settings directly to the radio through a wireless interface connecting the display and the radio, thereby eliminating the need for manually changing settings on the radio. A bi-directional transceiver reports the radio or other device's status to the pilot.

As noted above, traditional aircraft radios store two radio frequencies at a time. Currently the only way of having more radio frequencies available for immediate use is by installing multiple radios. An object of the invention addresses this problem by creating an airport frequency database derived from the national FAA database, storing multiple radio frequencies in memory sorted by airport and by city, and making the required frequencies available for immediate activation, thereby eliminating the need for multiple redundant radios. Another object of the invention is to provide automatic changes and activation of frequencies using a wireless transceiver linked to the radio itself.

Changing radio frequencies is presently accomplished by manually switching frequencies by turning mechanical dials associated with the tuner, or by scrolling an up/down display. This mechanical process is repeated for every frequency change. The present invention retrieves and displays the entire array of frequencies associated with services at any given airport on a single screen and provides for remote discretionary activation from a touch-screen device that sends the frequency data via a Bluetooth, Wi-Fi, or other VHF signal to the radio. The only lookup required in this scenario is the airport's 3-character ID, for example FXE (for Fort Lauderdale Executive Airport), a task which the invention executes using a database search facility.

Yet another significant aspect of the present invention is a voice command interpreter allowing for voice commands to administer various control levels including airport lookups and specific services. This service permits ad hoc changes on the fly to the radio or other electronic devices via the invention's digital interface and audio interpreter/voice recognition feature. This aspect of the invention facilitates immediate resetting of the radio such as in an emergency situation placing the pilot in rapid contact with local facilities such as a control tower, flight service station, approach-departure and nearby aircraft.

Yet another significant aspect of the present invention is the design and utility of the control interface which presents a pilot with communications procedures in the order in which they are expected according to Federal Air Regulations (FARs) and by Air Traffic Controllers. The frequencies corresponding to procedures are presented first to last, for a given physical airport, thereby eliminating the need for searching through channels, maps and directories or querying busy controllers to find the correct service and its frequency. In so doing the invention is providing a communications protocol guide not offered by the FAA or chart and directory publishers.

Yet another significant aspect of the present invention relates to the ease of touching the interface's buttons in quick succession without requiring a direct connection between the invention and one or more remote radios thereby making the nation's entire radio frequency database instantly accessible from a single radio.

Yet another significant aspect of the invention is the ability to change or control multiple physical radios in a redundant mode from the same application. Some aircraft have more than one radio for redundancy purposes. The invention is designed to change both radios simultaneously allowing the pilot to have both radios set to whichever frequency has been selected at that moment of selection, thereby providing a fail-safe.

An additional capability of the invention is the ability to change multiple physical radios independently from the same application. Some aircraft have more than one radio for co-pilot alternate communication purposes. The invention permits changing both radios independently from within the same application, allowing the pilot to be on one frequency and the co-pilot on a different frequency on a different radio.

These and other objects are met by the present invention which will become more apparent from the accompanying drawing and the following detailed description of the drawings and preferred embodiments.

DETAILED DESCRIPTION OF THE INVENTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
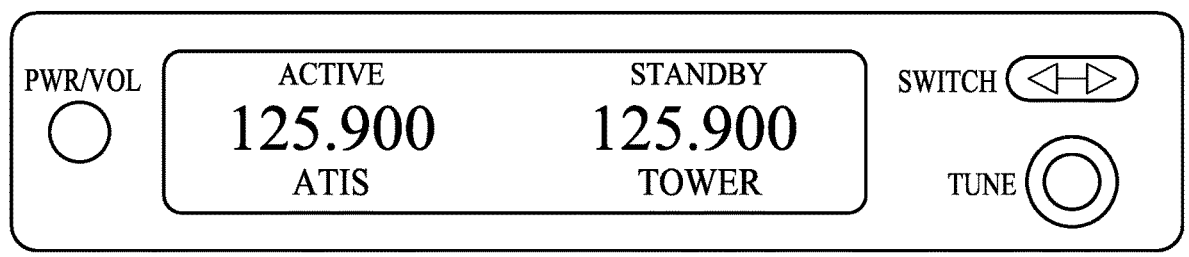
FIG. 1 is a schematic illustration of the front of a typical 2-channel aircraft radio of the prior art.
Figure 2:
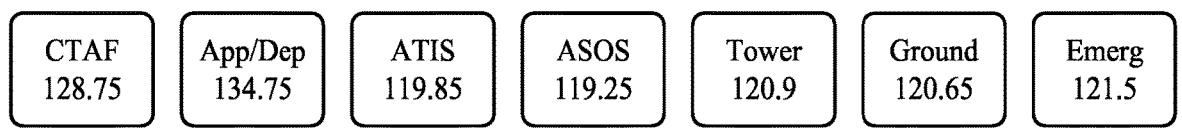
FIG. 2 display of common frequencies associated with VFR communications flow for an airport presented in typical order of use.
Figure 3:
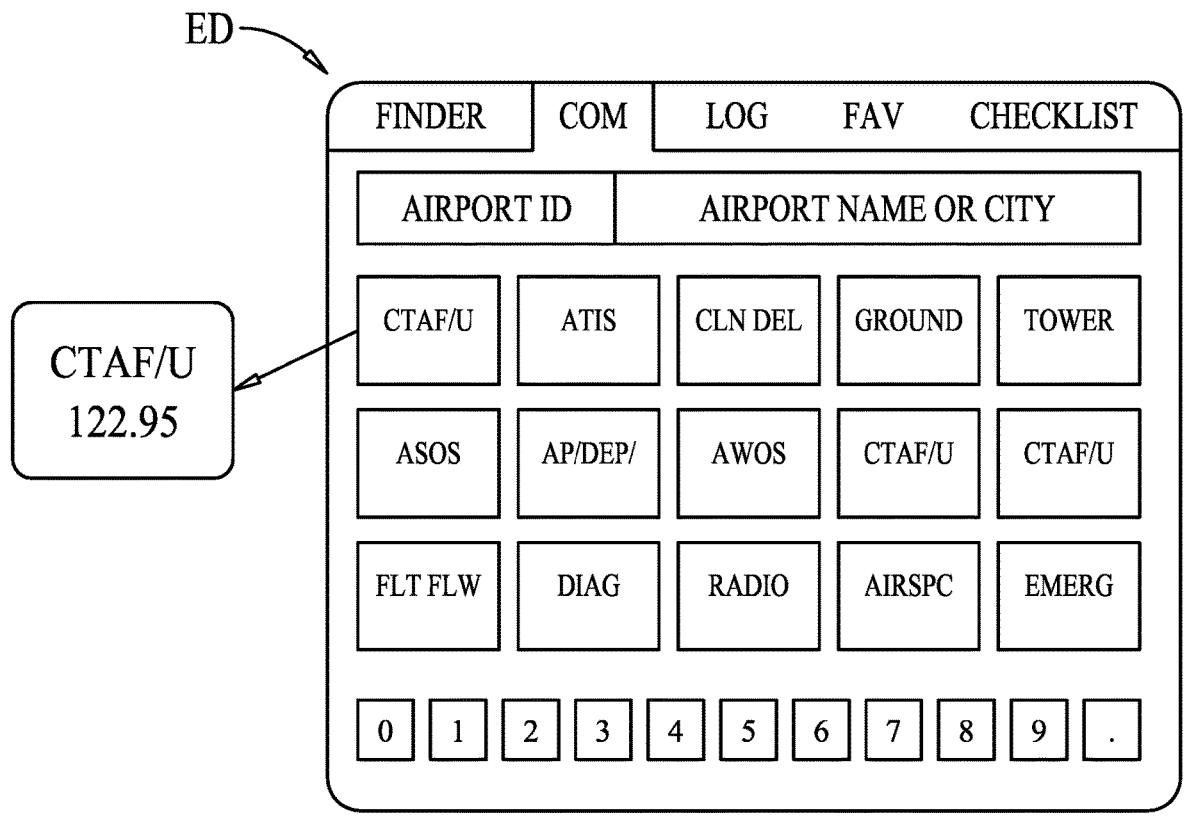
FIG. 3 is a schematic illustration of a display of radio frequencies and airport identification data presented on a single electronic display in accordance with the present invention.
Figure 4:
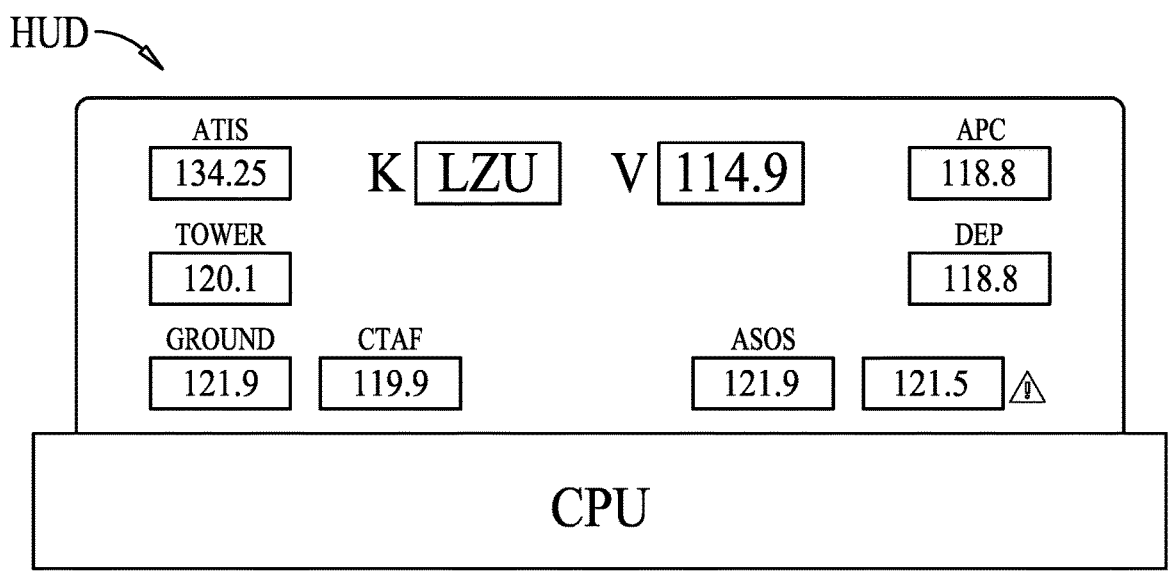
FIG. 4 is a schematic illustration of a head-up-display embodiment displaying radio frequencies and airport identification data in accordance with the present invention.

As noted above, FIG. 1 is a schematic illustration of the front panel of an aircraft radio in accordance with the prior art and illustrates a significant limitation having only a 2-channel capability, illustrated by the Active/Standby channel selection fields. FIG. 2 illustrates an example of VFR communications flow with exemplar radio frequencies associated with various aircraft facilities and operations. The various services and corresponding frequencies are presented in typical expected order of use (from left to right). FIG. 3 is a schematic illustration of an electronic display, generally referenced as "ED", presenting radio frequencies for a selected airport in accordance with the present invention. FIG. 4 is a schematic illustration of a head-up-display ("HUD"), generally referenced as "HUD", presenting radio frequencies for a selected airport in accordance with the present invention.

Figure 5:
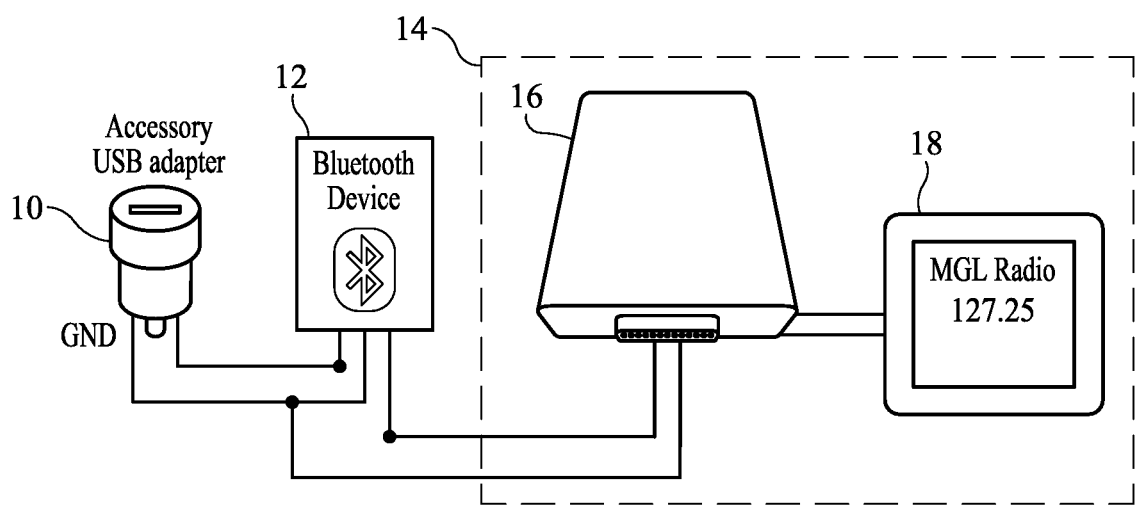
FIG. 5 is a system component wiring block diagram for a first embodiment of the present invention.

FIG. 5 is a schematic block diagram of components configured for operation with an aircraft radio in accordance with the present invention. Initially, certain hardware is provided to modify the existing aircraft radio to receive wireless communications. An adapter 10, such as an accessory USB adapter configured for connection to a 5-volt power outlet (i.e. cigarette lighter outlet) existing in the aircraft is provided. Adapter 10 is electrically wired to a wireless enabled communication device, referenced as 12, capable of receiving electronic wireless communications. In a preferred embodiment, the wireless enabled communication device operates using BLUETOOTH® technology. BLUETOOTH® is a registered trademark of Bluetooth SIG, Inc. of Kirkland, Wash. BLUETOOTH® is a wireless technology standard used for exchanging data between fixed and mobile devices over short distances using short-wavelength UHF radio waves in the industrial, scientific and medical radio bands, from 2.402 GHz to 2.480 GHz, and building personal area networks. While the present invention discloses use of BLUETOOTH wireless technology, other short-range wireless protocols may be used as equivalents with the present invention including Wi-Fi or radio-based protocols. Wireless enabled device 12 is wired to an aviation radio, generally referenced as 14, using the radio's integral transceiver 16. Radio transceiver 16 receives input to accept communications from wireless enabled device 12. The radio's user interface, referenced as 18, is the electronic display on which the pilot sees the active channel, and is modulated by signals received by the wireless device 12 and communicated to transceiver 16. In a preferred embodiment, radio transceiver 16 may be an integral OEM component of the aircraft radio 14 and housed within a common housing with user interface 18.

Figure 6:
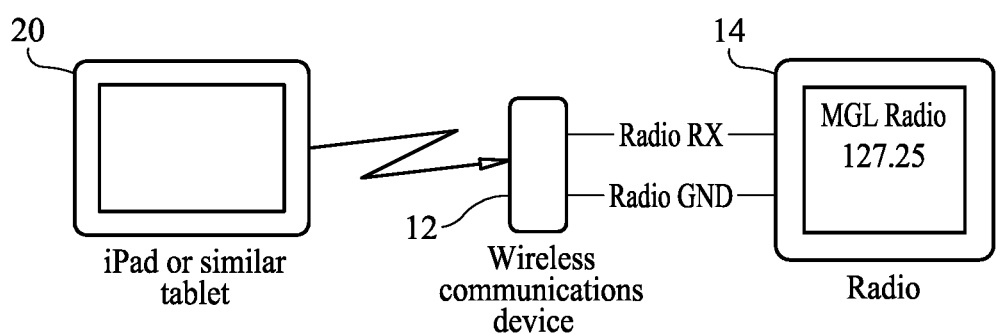
FIG. 6 is a simplified schematic block diagram illustrating electronic communication between devices in accordance with the present invention.

FIG. 6 is a simplified schematic block diagram illustrating electronic communication between devices in accordance with the present invention to change the active or standby frequency on an aircraft radio. A wireless enabled portable electronic device, referenced as 20, provides the primary user interface in accordance with the present invention. Portable electronic device 20 preferably comprises a tablet computer (e.g. iPad), laptop computer, smartphone, smartwatch, or any other suitable wireless enabled device. Portable electronic device is enabled for wireless communication and preferably includes an electronic touchscreen display. As more fully discussed herein, portable electronic device 20 has FAA data, including airport radio frequency data, stored thereon. In addition, the FAA data may comprise other airport related information including maps, charts, approach and departure procedures, telephone numbers etc. In a preferred embodiment, the FAA data is maintained and updated periodically via wireless communications such that the system presents the user with the most up to date data. When a pilot selects a desired airport by entering the three-letter geocode, known as the IATA airport code, the FAA airport radio frequency data for the airport is displayed on the wireless enabled portable electronic device 20, preferably in the format illustrated in FIG. 3. The pilot may then select one of the displayed frequencies using the touchscreen and electronic device 20. The selected frequency is then wirelessly transmitted from electronic device 20 to wireless enabled device 12, which in turn relays a hardwired signal to the aviation radio whereby the radio is tuned to eh selected frequency in either the active or standby slots for active use.

Figure 7:
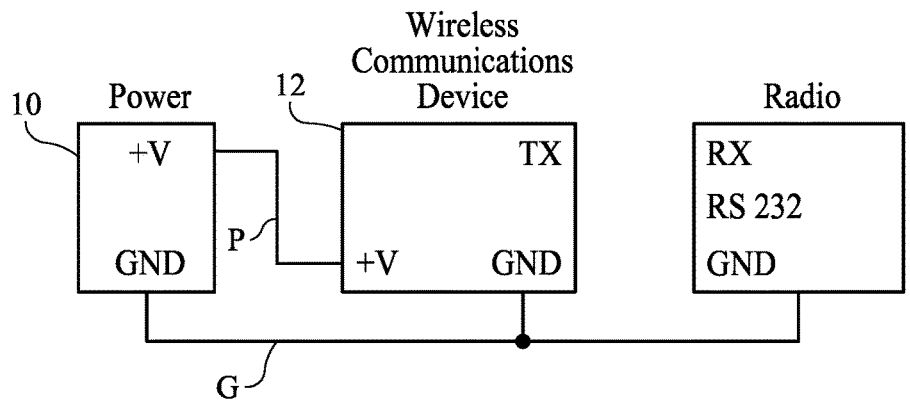
FIG. 7 is an electrical wiring schematic for the power source to the radio transceiver.

FIG. 7 is an electrical power wiring schematic that illustrates how power is supplied to components in accordance with the present invention. Power for the system is obtained from the aircraft by connection of power adapter 10. 5.0V dc power is supplied to the wireless enabled device 12 via hardwire connection, referenced as "P", as seen in FIG. 7. A ground wire, referenced as "G", is electrically connected to adapter 10, wireless enabled device 12, and radio 14.

Figure 8:
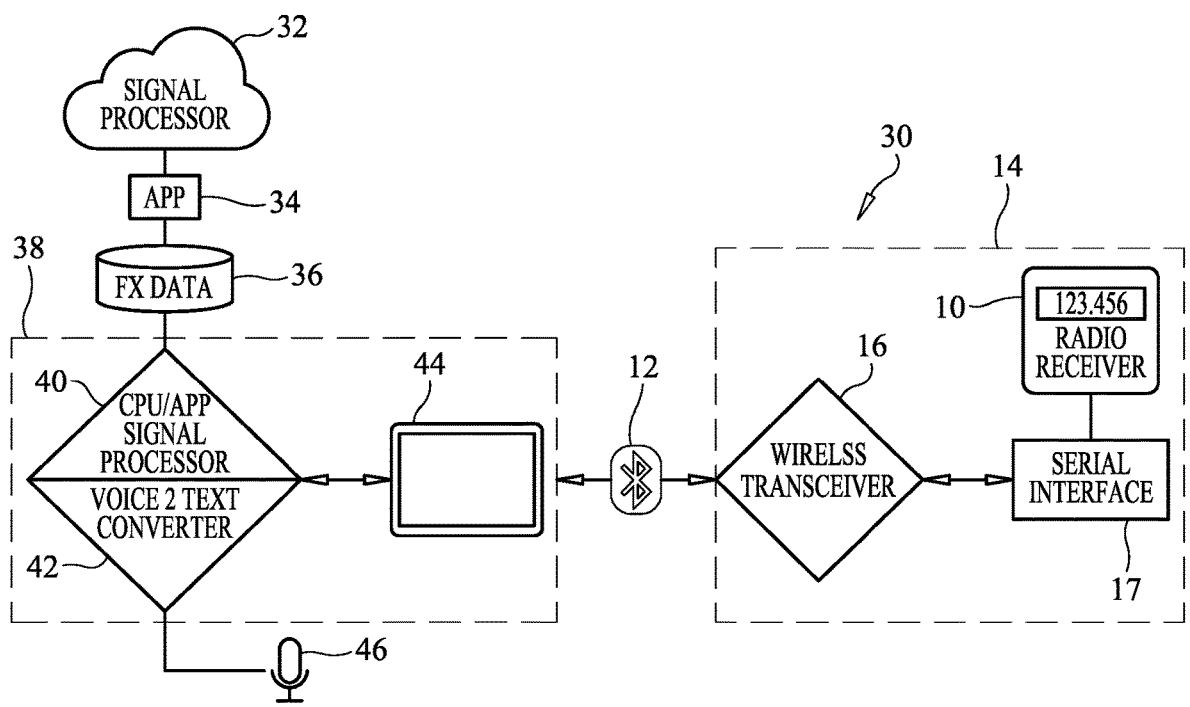
FIG. 8 is a system component block diagram for an embodiment of the present invention further incorporating voice to text functions.

FIG. 8 is a schematic block diagram of a multi-modal control system, generally referenced as 30, for communications and navigation in a transportation environment in accordance with the present invention. The present invention relies in part on the Internet, generally referenced as 32, for providing access to a downloadable software application (App) 34, and FAA cloud data 36. App 34 is downloadable to a wireless enabled portable electronic device 38, preferably via wireless communication. FAA cloud data 36 comprises FAA-supplied airport radio frequency data corresponding to frequencies used for various services (e.g. Tower, Ground Support, etc.) for airports around the world. FAA cloud data 36 may further include airport maps, automatic terminal information service (ATIS), and any other airport-related data.

Wireless enabled portable electronic device 38 preferably comprises a tablet computer, such as an APPLE® iPAD (APPLE® and iPAD® are registered trademarks of Apple, Inc. of Cupertino, Calif.), or smartphone, laptop computer, or any other suitable electronic device. Portable electronic device 38 provides a host device for installation of App 34, and includes a central processing unit (CPU)/App signal processor 40, voice-to-text conversion software 42, and an electronic touchscreen display 44 along with the customary hardware and batter power source which are customary with said device. A microphone 46 may also be integrated with portable electronic device 38 or may be a separate accessory installed on a headset. CPU/App signal processor 40 converts airport frequency data to BLUETOOTH® protocol for output. BLUETOOTH® is registered trademark of Bluetooth SIG, Inc., Kirkland, Wash. BLUETOOTH® is a wireless technology standard used for exchanging data between fixed and mobile devices over short distances using short-wavelength UHF radio waves in the industrial, scientific and medical radio bands, from 2.402 GHz to 2.480

GHz, and building personal area networks. Voice-to-text conversion software 42 is interfaced with CPU/App signal processor 40 and functions to convert speech input into text form for display on electronic display 44, a head-up display (HUD), or any other suitable output device.

As discussed, with App 34 and FAA data 36 downloaded to portable electronic device 38, the device functions to aid a pilot in operation of the aircraft's radio systems. Touchscreen display 44 presents a graphical user interface (GUI) identical, or similar to, the GUI display, referenced as D, illustrated in FIG. 3. Touchscreen display 44 further functions to receive alpha-numeric user input to allow the pilot to enter a desired airport using the 3-letter airport code, or alternatively airport name, city, or other short identifier. Upon entry of the airport code, App 34 retrieves the selected airport's frequencies displaying them on screen 44 (or other output device) in the format shown in FIG. 3. The pilot may then choose from among the data fields identified by function (e.g. Tower) with its associated frequency and taps the icon. The App then converts the selected frequency data to BLUETOOTH protocol and wirelessly transmits a signal to wireless enabled device 12 which has been installed in the aircraft as illustrated in FIGS. 5-7, and schematic block diagram in FIG. 8. Upon receipt of the signal, wireless enabled device 12 transmits the signal to the wireless transceiver 16 which relays the signal to the aircraft radio via serial interface 17 associated with the aircraft radio 14, whereby the radio is tuned to the selected frequency.

The device can be used alternatively as an expedient guide for use with traditional radios lacking a wireless controller interface. The national access database sorted by airport is available, however the pilot must set his radio manually. The conserved time and effort in avoiding use of printed directories and rapid retrieval of frequency data remains significant.

Voice-to-text converter 42 permits use of voice commands to the system to administer various control levels including airport lookups, making direct ad hoc changes on the fly to the digital interface with the radio or other electronic devices, an executing activity logs. The voice command scenario in emergency situations eliminates lookups and manual resetting of the radio, placing the pilot in immediate contact with local facilities such as a control tower, flight service station, approach-departure, and nearby aircraft. which functions to convert cockpit voice commands, as well as communications received within the cockpit (such as from the control tower) into text files that may be saved and/or used to select various airports or airport frequencies. For example, a pilot flying to Fort Lauderdale International Airport may simply say "FLL" or "Foxtrot-Lima-Lima" and the voice command interpreter 42 will convert that command to a search string such that the airport data for that airport is retrieved by the system and displayed. The pilot can then change the frequency of the radio to one of the displayed frequencies by merely saying e.g. "Tower" whereby App 34 will cause the portable electronic device 38 to send a command to the wireless enabled device 12 to set the radio's active frequency setting to the appropriate frequency.

In another embodiment, voice-to-text ("VTT") converter 42 may receive incoming voice communications from air traffic control and generate an electronic text display version of the communications such that the pilot is provided with a back-up reference of the communications. This feature is considered important when communications are difficult to discern due to static and cockpit noise. A particularly good application for voice-to-text conversion relates to incoming Automatic Terminal Information Service ("ATIS") communications. ATIS is a continuous broadcast of recorded aeronautical information that is routinely broadcast to arriving and departing aircraft. ATIS communications are broadcast as voice transmissions ("Voice-ATIS") by means of continued and repetitive voice broadcasts, as well as by data link ("D-ATIS"). General aviation pilots rely almost exclusively on Voice-ATIS since the use of D-ATIS requires the installation of additional costly receiver and display hardware which are mostly only found on larger commercial aircraft. In addition to ATIS communications, the present invention is suited for use with any control tower and/or air traffic control communications. As used herein the term "air traffic control communications" ("ATCC") shall broadly refer to any voice commands or instructions generated by an air traffic controller, or otherwise transmitted from an airport or airport control tower.

In one embodiment the present invention contemplates processing VTT from a received ATCC received in the aircraft. In accordance with this embodiment, VTT converter 42 converts incoming ATCC and coverts the ATCC to ASCII text. The ASCII text may then be displayed on a HUD as shown in FIG. 4 or an electronic display 44, or any other suitable display device. Further, the ASCII text may be electronically stored thereby providing a communications record, while further enabling the pilot to retrieve ATCC.

In another embodiment, a VTT converter is located at the airport, preferably in the control tower. In accordance with this embodiment, VTT takes place in the control tower at the point of highest quality audio and ASCII text is generated. In a preferred embodiment, the ASCII text is transmitted as sideband transmission along with the actual voice transmission. As should be apparent, the ASCII text may be received by the aircraft and displayed to the pilot on a suitable electronic display.

The instant invention has been shown and described herein in what is considered to be the most practical and preferred embodiment. It is recognized, however, that departures may be made therefrom within the scope of the invention and that obvious modifications will occur to a person to skilled in the art.

What I claim is:

1. An aviation radio frequency database and radio frequency control system to automate a retrieval of radio frequencies and tuning of an aircraft radio, said system comprising:

a wireless enabled portable electronic device having an electronic touchscreen display, and having airport data and a software application stored thereon;

said airport data including a plurality of data sets, each of said data sets corresponding to a particular airport, and each of said data sets including radio frequency data corresponding to said particular airport;

said software application generating a graphical user interface on said electronic touchscreen display, said graphical user interface including displayed fields for airport identification, and a plurality of airport service icons wherein each icon corresponds to one of a variety of airport services, each icon displaying indicia identifying a particular service and a radio frequency associated with said particular service;

means for selecting said airport by inputting airport identification data to said portable electronic device;

means for populating said plurality of icons with data retrieved from said airport data corresponding the selected airport, each icon displaying indicia identifying said particular airport service and said radio frequency associated with said particular airport service;

said icons populated in a predetermined order of expected use;

means for generating a wireless transmission in response to selection of one of said icons;

and means for automatically tuning the radio to the frequency associated with the selected icon in response to said wireless transmission.

2. The aviation radio frequency database and radio frequency control system according to claim 1 wherein said means for selecting said airport by inputting airport identification data includes entering airport identification information using said electronic touchscreen display.

3. The aviation radio frequency database and radio frequency control system according to claim 1 further including voice-to-text conversion software.

4. The aviation radio frequency database and radio frequency control system according to claim 3 wherein said means for selecting said airport by inputting airport identification data includes verbalizing an airport name, whereby said voice-to-text conversion software converts said verbalized name to text.

5. An aviation radio frequency database and radio frequency control system to automate a retrieval of radio frequencies and tuning of an aircraft radio, said system comprising:

a wireless enabled portable electronic device having an electronic touchscreen display, and having a software application stored thereon;

said software application configured to maintain a database of airport data and enabled for periodic wireless updating of said airport data via Internet communication, said airport data including a plurality of data sets, each of said data sets corresponding to a particular airport, and each of said data sets including radio frequency data corresponding to said particular airport;

said software application generating a graphical user interface on said electronic touchscreen display, said graphical user interface including displayed fields for airport identification, and a plurality of airport service icons wherein each icon corresponds to one of a variety of airport services, each icon configured to display indicia identifying a particular service and a radio frequency associated with said particular service;

said graphical user interface including an airport input field to receive user input of airport identification data to select said particular airport;

said software application populating said plurality of icons with data retrieved from said database of airport data corresponding the selected airport, each icon displaying indicia identifying said particular airport service and said radio frequency associated with said particular airport service;

said icons populated in a predetermined order of expected use;

said software application generating a wireless transmission in response to selection of one of said icons; and said wireless transmission automatically tuning the radio to the frequency associated with the selected icon in response to said wireless transmission.

6. The aviation radio frequency database and radio frequency control system according to claim 5 wherein said identification data includes entering a three-letter airport identifier.

7. The aviation radio frequency database and radio frequency control system according to claim 5 further including voice-to-text conversion software.

8. The aviation radio frequency database and radio frequency control system according to claim 7 wherein said means for selecting said airport by inputting airport identification data includes verbalizing an airport name, whereby said voice-to-text conversion software converts said verbalized name to text.

\* \* \* \* \*